H. A. SÉVIGNÉ.
RESHAPED SHEET METAL UTENSIL AND METHOD OF MAKING THE SAME.
APPLICATION FILED DEC. 15, 1916.
1,255,237.
Patented Feb. 5, 1918.
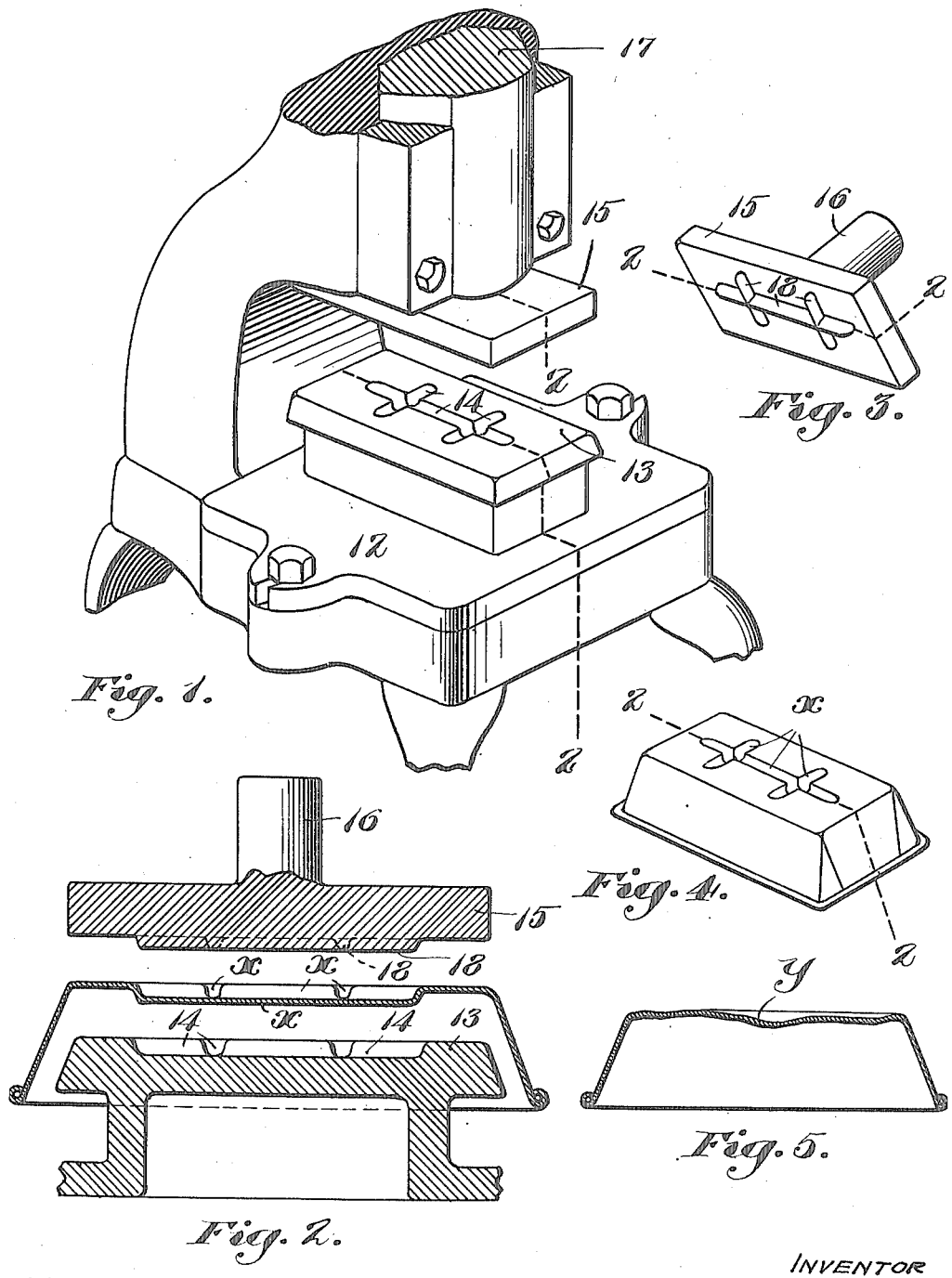
WITNESS
E. H. Chabot.
INVENTOR
Henri A. Sévigné.
BY
ATTY.

UNITED STATES PATENT OFFICE.

HENRI A. SÉVIGNÉ, OF WINTHROP, MASSACHUSETTS.

RESHAPED SHEET-METAL UTENSIL AND METHOD OF MAKING THE SAME.

1,255,237.                    Specification of Letters Patent.        Patented Feb. 5, 1918.

Application filed December 15, 1916. Serial No. 137,094.

*To all whom it may concern:*

Be it known that I, HENRI A. SÉVIGNÉ, of Winthrop, in the county of Suffolk and State of Massachusetts, have invented certain new and useful Improvements in Reshaped Sheet-Metal Utensils and Methods of Making the Same, of which the following is a specification.

This invention relates to sheet metal utensils for bakery and confectionery products, particularly such pans as are used by bakers for the production of loaves of bread or cake, although I do not limit myself to bake pans; and the object of my invention is to effect an economy in the production of the loaves or other articles by increasing the length of service of the utensils such as pans or other sheet metal ware employed in the production of the edible goods.
Owing to the high degree of heat employed in bakers' ovens, for instance, and the rapid variation of temperature when the bake pans are placed in a hot oven and removed therefrom, most pans become useless long before they should, owing to their becoming warped, the bottoms especially stretching and becoming irregular and changing from flat shape to partially or wholly concavo-convex. Such irregularities so interfere with proper baking that in large bakeries the expense of new pans to replace the short-lived distorted ones is frequently very considerable. One reason why pans having internally convex bottoms are objectionable for baking is that a space is formed between a portion of the bottom of the pan and the oven surface on which it rests, and this space interferes with the loaf having a uniformly baked bottom. Another reason is that most large bakeries sell their loaves inclosed in wrappers the edges of which are overlapped and sealed against the bottoms of the loaves. If the bottoms of the loaves are convex or concave, they cannot readily be properly wrapped.

By my invention, I not only restore distorted bake pans and similar utensils to a shape which adapts them for continued entirely practical use, but place them in condition which renders them less likely to become again distorted than when they were new.

My invention consists in the improved utensil and the method of making it, substantially as hereinafter described and claimed.

Of the accompanying drawings,

Figure 1 is a perspective view of so much as is necessary to illustrate one way of practising my invention.

Fig. 2 represents a section on line 2—2 in each of Figs. 1, 3 and 4.

Fig. 3 is a perspective view of the upper die shown in Fig. 1.

Fig. 4 is a perspective view of a re-shaped pan.

Fig. 5 represents a section through a distorted pan.

It is to be understood that the tools or apparatus illustrated in the drawings are shown simply for the purpose of aiding the description of my invention, and that the improved pans or similar utensils may be produced by the method carried out manually, facilitated by the use of selected shaping implements.

In Fig. 1, the bed or table of a suitable press is indicated at 12, and on this is supported a die 13 having its margin of a size and shape to substantially fit the inside of the pan to be re-shaped. The face of the die is flat excepting for the grooves 14 therein, which grooves may be so related as to be in the form of a double-end cross, or may be of other configuration.

An upper die 15, having its shank 16 connected to a vertically movable plunger 17, has its lower face flat excepting for ribs 18 which correspond to the grooves 14 of die 13.

To restore a pan having a bottom distorted or stretched by heat to an irregular form such as indicated at *y* in Fig. 5, to condition for use, the pan is placed between the two dies and subjected to such pressure as is required (according to the thickness of the metal and the amount of distortion) to draw the surplus metal of most of the bottom into ribs, thereby flattening all portions of the pan bottom engaged by the flat surfaces of the dies. If the dies were entirely flat, the pressure would simply produce wrinkles or small folds in the metal, and cause more or less fracturing at the sharp angles of the folds or wrinkles. The ribs 18 of one die, however, as they pass into the grooves 14 of the other die, draw the metal of the area that is to be flat, and dispose of the extra metal so drawn, into ribs having yieldable sides as indicated at *x* in Figs. 2 and 4. These ribs can not, afterward, change their shapes due to changes in temperature.

The operation described re-shapes the pan and gives its bottom ample flat area to insure uniform baking of the bottom of the loaf, the ribs *x* simply producing a not unattractive design in the bottom of the loaf. The drawing or straightening out of the metal removes from it so much of its tendency to expand and contract during changes in temperature, that the remaining tendency is counteracted by the ability of the side walls of the ribs to yield and permit the flat areas to expand or contract without buckling. The ribs also stiffen the pan bottom, as will be readily understood.

I do not limit myself to the particular design of the corrugations or internal ribs of the pan bottom, nor to the relative amount of space occupied by them, although I have found, after experiments with other forms that the one illustrated is best because it provides for the requisite disposition into ribs of all the extra or surplus metal resulting from straightening out the previously heat-stretched metal. It does not produce any further stretching but merely flattens the main portion of the bottom in equally distributed areas, and forms ribs which not only strengthen the bottom but provide yielding divisions between said areas. Preferably the ribs should not be larger than indicated in the drawings, since otherwise they might interfere with uniform baking; or the resultant grooves in the bottom of the loaf, if very large, might interfere with the sealing of the wrapper edges hereinbefore referred to, and as explained in Letters Patent 1,131,561, March 9, 1915.

Having now described my invention, I claim:

1. A sheet metal utensil re-shaped after having its bottom warped by the action of the heat, said utensil having the main portion of its bottom drawn flat with predetermined internal ribs having yielding sides.

2. A sheet metal utensil re-shaped after having its bottom warped by the action of the heat, said utensil having its bottom provided with corrugations, the main area being drawn flat, whereby the sides of the corrugations may yield to compensate for expansion or contraction of the flat area.

3. A sheet metal utensil re-shaped after having its bottom warped by the action of the heat, said utensil having its bottom formed with equally distributed flat areas partially separated from each other by internal ribs in the form of a double cross.

4. The method of restoring heat-distorted sheet metal utensils to condition for practical use, consisting in simultaneously flattening the main areas of the bottoms of the utensils and forming internal ribs therein.

5. The method of restoring heat-distorted sheet metal utensils to condition for practical use, consisting in drawing the metal of the bottoms of the utensils toward their central portions, forming internal ribs in said central portions, and flattening the areas around said ribs.

In testimony whereof I have affixed my signature.

HENRI A. SÉVIGNÉ.